US010876644B2

(12) United States Patent
Lokanatha et al.

(10) Patent No.: US 10,876,644 B2
(45) Date of Patent: Dec. 29, 2020

(54) ASPIRATOR SYSTEM PRESSURE RELIEF MECHANISM

(71) Applicant: GOODRICH CORPORATION, Charlotte, NC (US)

(72) Inventors: Naveen Lokanatha, Karnataka (IN); Satya Swaroop Panda, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/222,044

(22) Filed: Dec. 17, 2018

(65) Prior Publication Data
US 2019/0360604 A1    Nov. 28, 2019

(30) Foreign Application Priority Data

May 22, 2018   (IN) .............................. 201811019130

(51) Int. Cl.
*F16K 17/04*   (2006.01)
*F16K 24/04*   (2006.01)
(Continued)

(52) U.S. Cl.
CPC ........ *F16K 17/0413* (2013.01); *F16K 17/044* (2013.01); *F16K 24/04* (2013.01); *F16K 27/003* (2013.01); *B63C 9/24* (2013.01); *B64D 25/14* (2013.01); *F16K 15/038* (2013.01); *F16K 27/0209* (2013.01); *F16K 47/045* (2013.01); *Y10T 137/7838* (2015.04);
(Continued)

(58) Field of Classification Search
CPC ......... Y10T 137/7839; Y10T 137/7838; Y10T 137/7875; Y10T 137/7874; Y10T 137/7903; Y10T 137/7841; Y10T 137/7859; Y10T 137/7842; Y10T 137/87378; Y10T 137/87394; F16K 15/038; F16K 27/0209; F16K 47/045; F16K 17/0413; F16K 17/044; F16K 24/04; F16K 27/003; B63C 9/24; B64D 25/14
See application file for complete search history.

(56) References Cited

U.S. PATENT DOCUMENTS 2,140,734 A   12/1938 Chandler
2,576,637 A   11/1951 Patriquin
(Continued)

FOREIGN PATENT DOCUMENTS

CN   102818051 A   12/2012
JP   S54161664 U   11/1979
(Continued)

OTHER PUBLICATIONS

EP Search Report for Application No. 19175765.7 dated Oct. 14, 2019, 8 pages.
(Continued)

*Primary Examiner* — Marina A Tiet Jen
*Assistant Examiner* — Frederik D Soski
(74) *Attorney, Agent, or Firm* — Cantor Colburn LLP

(57) ABSTRACT

A flapper assembly for an aspirator system includes a flapper plate and a valve assembly. The flapper plate defines a first plurality of apertures. The valve assembly includes a first valve plate disposed over the first plurality of apertures and a first pressure relief assembly arranged to move the first valve plate relative to the flapper plate.

15 Claims, 3 Drawing Sheets

(51) Int. Cl.
  *F16K 27/00* (2006.01)
  *B60C 29/00* (2006.01)
  *B64D 25/14* (2006.01)
  *F16K 47/04* (2006.01)
  *F16K 15/03* (2006.01)
  *F16K 27/02* (2006.01)

(52) U.S. Cl.
  CPC .... *Y10T 137/7839* (2015.04); *Y10T 137/7841* (2015.04); *Y10T 137/7874* (2015.04); *Y10T 137/7875* (2015.04); *Y10T 137/7903* (2015.04)

(56) References Cited

U.S. PATENT DOCUMENTS

| | | | |
|---|---|---|---|
| 3,012,572 A | 12/1961 | Bargetzi, Jr. et al. | |
| 3,037,523 A | 6/1962 | Szanszo | |
| 3,363,947 A * | 1/1968 | Cagle | B60T 11/105 303/18 |
| 3,370,784 A * | 2/1968 | Day | B63C 9/24 417/167 |
| 3,572,974 A * | 3/1971 | Day | B64D 25/14 417/179 |
| 3,952,542 A | 4/1976 | Berkowitz | |
| 5,372,109 A | 12/1994 | Thompson et al. | |
| 5,421,775 A | 6/1995 | Honda | |
| 5,607,140 A | 3/1997 | Short, III et al. | |
| 6,004,176 A * | 12/1999 | Moran | B64D 25/14 417/191 |
| 6,264,452 B1 | 7/2001 | Sun et al. | |
| 2003/0131894 A1 | 7/2003 | Heckt et al. | |
| 2006/0237680 A1 * | 10/2006 | Denike | B64D 13/02 251/305 |
| 2008/0078458 A1 | 4/2008 | Denike et al. | |
| 2010/0202899 A1 | 8/2010 | McNeil et al. | |
| 2010/0266424 A1 * | 10/2010 | Renz | F04F 5/466 417/191 |
| 2017/0254580 A1 | 9/2017 | Hiller et al. | |
| 2017/0297726 A1 * | 10/2017 | Volny | F04F 5/14 |
| 2019/0010962 A1 * | 1/2019 | White | B64D 25/14 |
| 2019/0091704 A1 * | 3/2019 | McEwen | F04F 5/461 |

FOREIGN PATENT DOCUMENTS

| | | |
|---|---|---|
| JP | 2003120283 A | 4/2003 |
| JP | 2011157887 A | 8/2011 |
| KR | 101618284 B1 | 5/2016 |
| WO | 2010139917 A1 | 12/2010 |

OTHER PUBLICATIONS

European Office Action; Application No. 19175765.7-1015; dated Sep. 30, 2020; 6 pages.

\* cited by examiner

ASPIRATOR SYSTEM PRESSURE RELIEF MECHANISM

FOREIGN PRIORITY

This patent application claims priority to Indian Provisional Patent Application Serial No. 201811019130, filed May 22, 2018, which is incorporated herein by reference in its entirety.

BACKGROUND

Exemplary embodiments pertain to the art of aspirators.

Aspirators are used in systems that inflate various inflatable assemblies such as evacuation slides, rafts, or the like. Aspirators rapidly inflate an inflatable assembly to a predetermined pressure. Excess pressure may be vented by a pressure relief valve that is integrated into the inflatable assembly. The integrated pressure relief valve may leak or may create difficulties during packaging and handling of the inflatable assembly.

BRIEF DESCRIPTION

Disclosed is an aspirator system that includes an aspirator body and a flapper assembly. The aspirator body has an inner surface and an outer surface, each extending between an inlet and an outlet, along a central longitudinal axis. The flapper assembly includes a flapper plate, a pivot member, and a valve assembly. The pivot member is disposed on the flapper plate and is pivotally connected to the inner surface and is disposed proximate the inlet. The valve assembly is disposed on the flapper plate.

Also disclosed is an aspirator system that includes an aspirator body and a flapper assembly. The aspirator body extends between an inlet and an outlet. The flapper assembly is pivotally connected to the aspirator body and includes a flapper plate, a pivot member, and a valve assembly. The flapper plate defines a first plurality of apertures and a second plurality of apertures. The pivot member is disposed on the flapper plate. The valve assembly includes a first valve plate movably disposed over the first plurality of apertures and a second valve plate movably disposed over the second plurality of apertures.

Further disclosed is a flapper assembly for an aspirator system. The flapper assembly includes a flapper plate and a valve assembly. The flapper plate defines a first plurality of apertures. The valve assembly includes a first valve plate disposed over the first plurality of apertures and a first pressure relief assembly arranged to move the first valve plate relative to the flapper plate.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
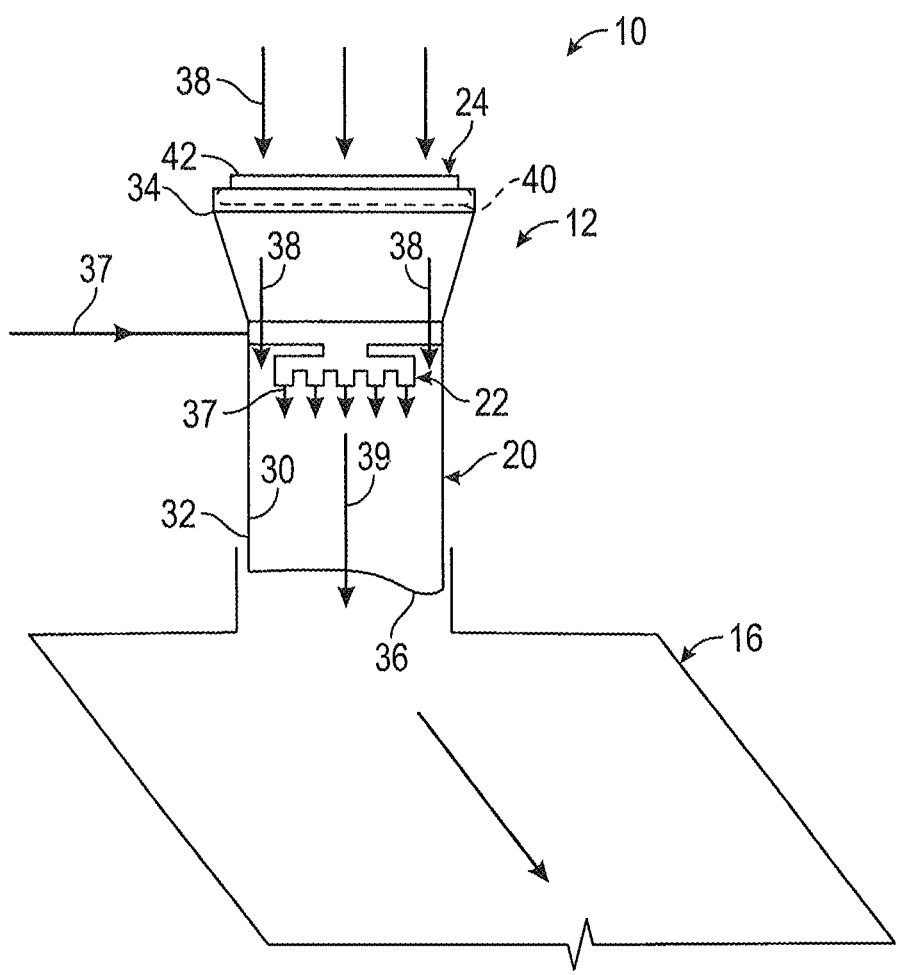
FIG. 1 is a schematic illustration of an aspirator system connected to an inflatable assembly.

Referring to FIG. 1, an aspirator system 10 is illustrated. The aspirator system 10 includes an aspirator 12. The aspirator 12 is arranged to rapidly inflate an inflatable assembly 16 such as an evacuation slide, an inflatable raft, a flotation device, or other inflatable device. The aspirator 12 includes an aspirator body 20, a nozzle assembly 22, and a flapper assembly 24.

The aspirator body 20 has an inner surface 30 and an outer surface 32. The inner surface 30 and the outer surface 32 of the aspirator body 20 extend between an inlet 34 and an outlet 36 along a central longitudinal axis.

The nozzle assembly 22 is disposed within the aspirator body 20. The nozzle assembly 22 is disposed proximate the inlet 34 of the aspirator body 20.

The flapper assembly 24 is pivotally connected to the inner surface 30 of the aspirator body 20. The flapper assembly 24 is disposed proximate the inlet 34.

A first fluid flow 37 from a first fluid source is provided to the nozzle assembly 22 and the first fluid flow 37 is ejected into the interior of the aspirator body 20 through a plurality of nozzles of the nozzle assembly 22. The first fluid flow 37 entrains/induces a second fluid flow 38 from a second fluid source through the inlet 34 and causes the flapper assembly 24 to pivot to enable the second fluid flow 38 to enter into the aspirator body 20. The first fluid flow 37 and the second fluid flow 38 are mixed within the aspirator body 20 and the mixed flow 39 is discharged into the inflatable assembly 16 through the outlet 36 to inflate the inflatable assembly 16.

The first fluid source may be a pressurized gas source that is discharged into the aspirator body 20 at a high velocity through the plurality of nozzles of the nozzle assembly 22. The second fluid source may be ambient air or a lower pressure gas source as compared to the first fluid source.

The flapper assembly 24 is pivotable between an open position and a closed position. The flapper assembly 24 is arranged to pivot towards the open position to open the inlet 34 during an inflation process while the second fluid flow 38, being greater than a threshold, flows into the aspirator body 20. The flapper assembly 24 is arranged to pivot towards the closed position to close the inlet 34, at the end or towards the end of the inflation process, responsive to a fluid flow rate through the inlet 34 being less than a threshold, to inhibit the second fluid flow 38 from entering the aspirator body 20.

Figure 2:
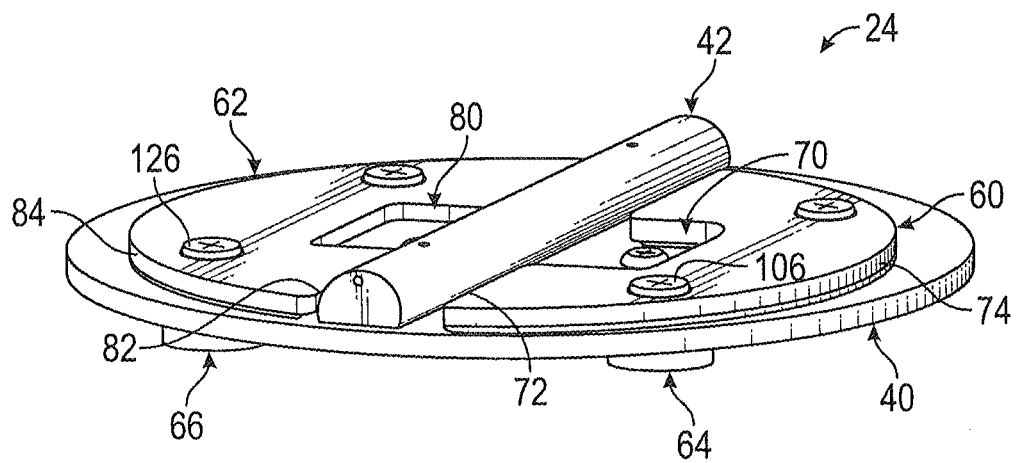
FIG. 2 is a perspective view of a flapper assembly of the aspirator system.
Figure 3:
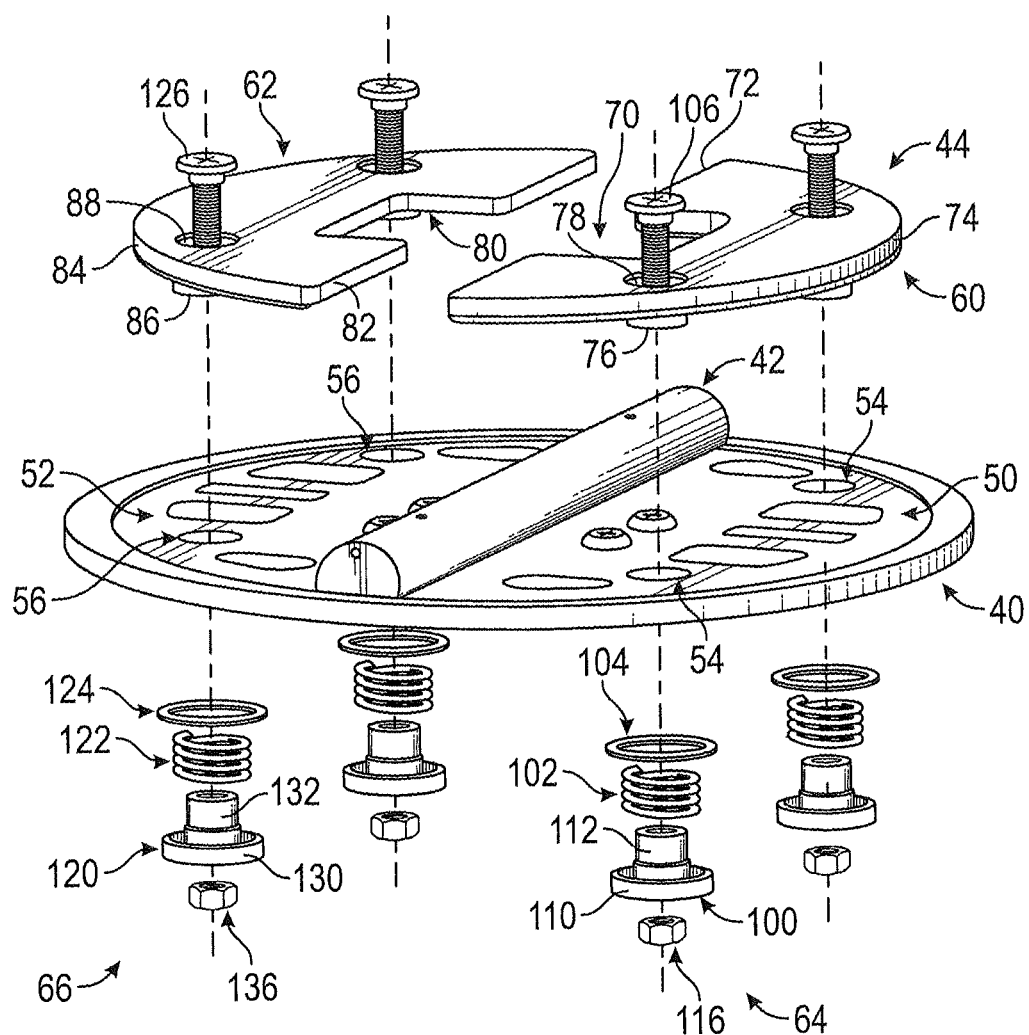
FIG. 3 is a disassemble view of the flapper assembly.
Figure 4:
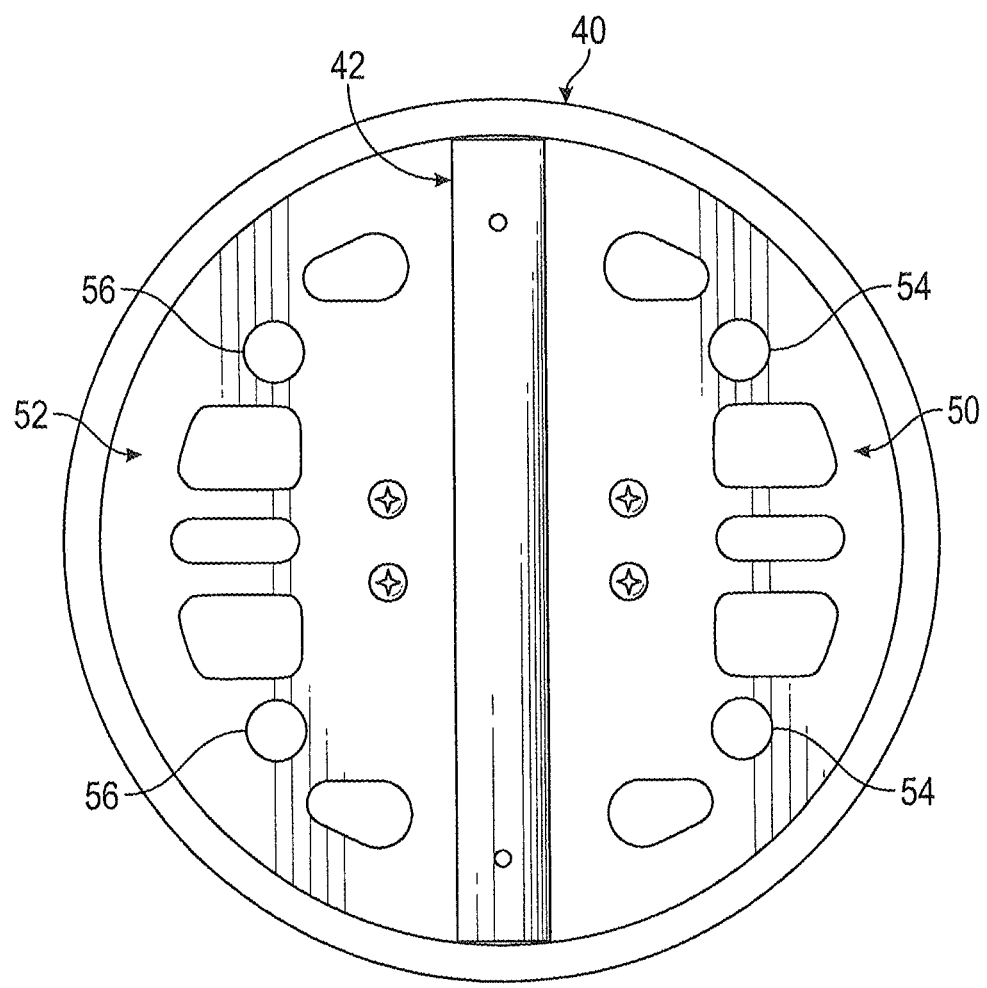
FIG. 4 is a plan view of a flapper plate of the flapper assembly.

Referring to FIGS. 2-4, the flapper assembly 24 includes a flapper plate 40, a pivot member 42, and a valve assembly 44.

Referring to FIGS. 3 and 4, the flapper plate 40 defines a first plurality of apertures 50 and a second plurality of apertures 52 that are spaced apart from the first plurality of apertures 50. The first plurality of apertures 50 and the second plurality of apertures 52 are sized to provide a desired pressure relief flow area through the flapper plate 40.

The first plurality of apertures 50 are at least partially disposed about a first portion of the flapper plate 40. The first plurality of apertures 50 extend completely through the first portion of the flapper plate 40. A first mounting hole 54 is disposed between adjacent apertures of the first plurality of apertures 50. The first mounting hole 54 may have a shape that is different from the shape of the adjacent apertures of the first plurality of apertures 50.

The second plurality of apertures 52 are at least partially disposed about a second portion of the flapper plate 40 that is circumferentially spaced apart from the first portion of the flapper plate 40. The second plurality of apertures 52 extend completely through the second portion of the flapper plate 40. A second mounting hole 56 is disposed between adjacent apertures of the second plurality of apertures 52. The second mounting hole 56 may have a shape that is different from the shape of the adjacent apertures of the second plurality of apertures 52.

Referring to FIGS. 2-4, the pivot member 42 is disposed on the flapper plate 40. The pivot member 42 is disposed between the first plurality of apertures 50 and the second plurality of apertures 52. The first plurality of apertures 50 and the second plurality of apertures 52 are spaced apart from or segregated from each other by the pivot member 42. The pivot member 42 is pivotally connected to the inner surface 30 of the aspirator body 20 such that the flapper assembly 24 is pivotally connected to the aspirator body 20.

Referring to FIGS. 2 and 3, the valve assembly 44 enables the flapper assembly 24 to provide pressure relieving functions. The valve assembly 44 is movably disposed on the flapper plate 40 and selectively covers the plurality of apertures. The valve assembly 44 includes a first valve plate 60, a second valve plate 62, a first pressure relief assembly 64, and a second pressure relief assembly 66.

The first valve plate 60 is movably disposed over the first plurality of apertures 50. The first valve plate 60 is a generally arcuate plate having a profile that complements the shape of the flapper plate 40. The first valve plate 60 defines a first cut out 70 that extends from a first inner surface 72 towards a portion of an outer periphery 74 of the first valve plate 60.

The first valve plate 60 includes a first mounting lug 76 that extends from a surface of the first valve plate 60 and is arranged to be received within the first mounting hole 54. The first mounting lug 76 may be a hollow lug having a first opening 78 that extends through the first mounting lug 76. The first opening 78 is arranged to be disposed coaxial with the first mounting hole 54.

The second valve plate 62 is spaced apart from the first valve plate 60. The pivot member 42 is disposed between the first valve plate 60 and the second valve plate 62. The second valve plate 62 is movably disposed over the second plurality of apertures 52. The second valve plate 62 is a generally arcuate plate having a profile that complements the shape of the flapper plate 40. The second valve plate 62 defines a second cutout 80 that extends from a second inner surface 82 towards a portion of an outer periphery 84 of the second valve plate 62.

The second valve plate 62 includes a second mounting lug 86 that extends from a surface of the second valve plate 62 and is arranged to be received within the second mounting hole 56. The second mounting lug 86 may be a hollow lug having a second opening 88 that extends through the second mounting lug 86. The second opening 88 is arranged to be disposed coaxial with the second mounting hole 56.

The first pressure relief assembly 64 is arranged to move the first valve plate 60 relative to the flapper plate 40 to selectively expose the first plurality of apertures 50 to perform a pressure relieving function. The first pressure relief assembly 64 is arranged to be connected to at least one of the first valve plate 60 and the first portion of the flapper plate 40. The first pressure relief assembly 64 includes a first retainer 100, a first biasing member 102, a first washer 104, and a first fastener 106.

The first retainer 100 includes a first base 110 and a first extension 112 extending from the first base 110. The first base 110 is disposed proximate an underside of the flapper plate 40. The first extension 112 of the first retainer 100 extends at least partially into the first mounting hole 54 of the flapper plate 40 and into the first opening 78 of the first mounting lug 76.

The first biasing member 102 is disposed about the first extension 112 of the first retainer 100. The first biasing member 102 is disposed between the first base 110 of the first retainer 100 and the first washer 104. The first biasing member 102 has a spring rate or spring stiffness that ensures that the ambient air flow that pushes or opens the flapper assembly 24 during inflation is undisturbed and ensures that the first valve plate 60 covers or closes the first plurality of apertures 50 during inflation and is only active after inflation. The first biasing member 102 is arranged to bias the first valve plate 60 towards an open position that exposes the first plurality of apertures 50 responsive to a pressure within the inflatable assembly 16 and/or the aspirator body 20 exceeding a working pressure or desired pressure while the flapper assembly 24 is in a closed position.

The first washer 104 engages an underside of the flapper plate 40. The first washer 104 is disposed between the first base 110 of the first retainer 100 and the underside of the flapper plate 40.

The first fastener 106 extends through the first opening 78 of the first mounting lug 76 of the first valve plate 60, extends through the first mounting hole 54 of the flapper plate 40, and extends into the first extension 112 of the first retainer 100. A first fastening member 116, such as a nut, engages the first fastener 106 to secure the first fastener 106 to the first valve plate 60 and the first retainer 100.

The second pressure relief assembly 66 is arranged to move the second valve plate 62 relative to the flapper plate 40 to selectively expose the second plurality of apertures 52 to perform a pressure relieving function. The second pressure relief assembly 66 is arranged to be secured to at least one of the second valve plate 62 and the second portion of the flapper plate 40. The second pressure relief assembly 66 includes a second retainer 120, a second biasing member 122, a second washer 124, and a second fastener 126.

The second retainer 120 includes a second base 130 and a second extension 132 extending from the second base 130. The second base 130 is disposed proximate an underside of the flapper plate 40. The second extension 132 of the second retainer 120 extends at least partially into the second mounting hole 56 of the flapper plate 40 and into the second opening 88 of the second mounting lug 86.

The second biasing member 122 is disposed about the second extension 132 of the second retainer 120. The second biasing member 122 is disposed between the second base 130 of the second retainer 120 and the second washer 124. The second biasing member 122 has a spring rate or spring stiffness that ensures that the ambient air flow that pushes or opens the flapper assembly 24 during inflation is undisturbed and ensures that the second valve plate 62 covers or closes the second plurality of apertures 52 during inflation and is only active after inflation. The second biasing member 122 is arranged to bias the second valve plate 62 towards an open position that exposes the second plurality of apertures 52 responsive to a pressure within the inflatable assembly 16 and/or the aspirator body 20 exceeding a working pressure or desired pressure while the flapper assembly 24 is in a closed position.

The second washer 124 engages an underside of the flapper plate 40. The second washer 124 is disposed between the second base 130 of the second retainer 120 and the underside of the flapper plate 40.

The second fastener 126 extends through the second opening 88 of the second mounting lug 86 of the second valve plate 62, extends through the second mounting hole 56 of the flapper plate 40, and extends into the second extension 132 of the second retainer 120. A second fastening member 136 such as a nut engages the second fastener 126 to secure the second fastener 126 to the second valve plate 62 and the second retainer 120.

The valve assembly 44 integrated into the flapper plate 40 functions as a reverse valve mechanism that provides a pressure relieving function should the working pressure or desired pressure within the inflatable assembly 16 exceed a threshold while the flapper assembly 24 is in a closed position. Responsive to the working pressure of the desire pressure within the inflatable assembly 16 exceeding a threshold, at least one of the first pressure relief assembly 64 moves the first valve plate 60 relative to the first plurality of apertures 50 and/or the second pressure relief assembly 66 move the second valve plate 62 relative to the second plurality of apertures 52 to relieve the high pressure at least until the pressure returns to the desired pressure or working pressure within the inflatable assembly 16.

The valve assembly 44 being integrated into the flapper plate 40 of the flapper assembly 24 eliminates a dedicated pressure relief valve that is integrated into the inflatable assembly 16 and increases packing efficiency of the inflatable assembly 16. The valve assembly 44 being integrated into the flapper plate 40 of the flapper assembly 24 transforms the flapper assembly 24 into a dual purpose component that performs consistently across different temperature conditions, unlike pressure relief valves integrated into the inflatable assembly 16.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aspirator system, comprising:
    an aspirator body having an inner surface and an outer surface, each extending between an inlet and an outlet, along a central longitudinal axis; and
    a flapper assembly, comprising:
        a flapper plate,
        a pivot member disposed on the flapper plate and pivotally connected to the inlet, and
        a valve assembly disposed on the flapper plate, wherein the flapper plate defines a plurality of apertures, and the valve assembly includes a plurality of reciprocating valve plates that are configured such that the plurality of reciprocating valve plates reciprocates from pressure inside the aspirator body relative to the flapper plate, so that the plurality of reciprocating valve plates are either against the flapper plate and cover the plurality of apertures, or spaced apart from the flapper plate and uncover the plurality of apertures.

2. The aspirator system of claim 1, wherein the flapper plate defines a mounting hole that is disposed between adjacent apertures of the plurality of apertures.

3. The aspirator system of claim 1, wherein the plurality of valve plates each include a mounting lug that is arranged to extend into the mounting hole.

4. The aspirator system of claim 1, wherein the valve assembly includes a pressure relief assembly that is arranged to be secured to at least one of the plurality of valve plates and the flapper plate.

5. The aspirator system of claim 4, wherein the pressure relief assembly is arranged to reciprocate the plurality of valve plates relative to the flapper plate.

6. The aspirator system of claim 1, wherein:
    the plurality of apertures define a first plurality of apertures and a second plurality of apertures, and
    the plurality of valve plates comprise:
        a first valve plate movably disposed over the first plurality of apertures, and
        a second valve plate movably disposed over the second plurality of apertures.

7. The aspirator system of claim 6, wherein the pivot member is disposed between the first valve plate and the second valve plate.

8. The aspirator system of claim 6, wherein the valve assembly, further comprising:
    a first pressure relief assembly operatively connected to the flapper plate and arranged to move the first valve plate relative to the flapper plate; and
    a second pressure relief assembly operatively connected to the flapper plate and arranged to move the second valve plate relative to the flapper plate.

9. The flapper assembly of claim 6, wherein the first plurality of apertures are at least partially disposed about a first portion of the flapper plate.

10. The flapper assembly of claim 6, wherein the flapper plate defines a first mounting hole that is disposed between adjacent apertures of the first plurality of apertures.

11. The flapper assembly of claim 10, wherein the first pressure relief assembly includes:
    a first retainer that extends at least partially into the first mounting hole, and
    a first biasing member disposed about a portion of the first retainer and arranged to engage the first valve plate.

12. The flapper assembly of claim 9, wherein the second plurality of apertures that are spaced apart from the first plurality of apertures.

13. The flapper assembly of claim 12, wherein the second plurality of apertures are at least partially disposed about a second portion of the flapper plate.

14. The flapper assembly of claim 11, wherein the flapper plate defines a second mounting hole that is disposed between adjacent apertures of the second plurality of apertures.

15. The flapper assembly of claim 14, wherein the second pressure relief assembly includes:
   a second retainer that extends at least partially into the second mounting hole; and
a second biasing member disposed about a portion of the second retainer and arranged to engage the second valve plate.

\* \* \* \* \*